United States Patent [19]

Retallick et al.

[11] Patent Number: 5,658,412
[45] Date of Patent: Aug. 19, 1997

[54] METHOD AND APPARATUS FOR PRODUCING A THREE-DIMENSIONAL OBJECT

[75] Inventors: Dave Retallick, Münsterhausen; Johannes Reichle, München; Hans J. Langer, Gräfelfing, all of Germany

[73] Assignee: EOS GmbH Electro Optical Systems, Planegg, Germany

[21] Appl. No.: 284,511

[22] PCT Filed: Dec. 30, 1993

[86] PCT No.: PCT/EP93/03725

§ 371 Date: Aug. 8, 1994

§ 102(e) Date: Aug. 8, 1994

[87] PCT Pub. No.: WO94/13771

PCT Pub. Date: Jul. 21, 1994

[30] Foreign Application Priority Data

Jan. 11, 1993 [DE] Germany ............... 43 00 478.4

[51] Int. Cl.⁶ .................................................. B29C 35/08
[52] U.S. Cl. ........................... 156/272.8; 156/273.3; 156/273.5; 156/275.5; 156/379.8; 156/381; 264/497; 264/85; 264/125; 264/308; 425/174.4
[58] Field of Search ............... 156/272.2, 273.3, 156/273.5, 275.5, 290, 307.1, 359, 379.6, 379.8, 381, 382, 272.8; 264/22, 308, DIG. 59, 405, 497, 85, 125; 425/174.4

[56] References Cited

U.S. PATENT DOCUMENTS

| | | | |
|---|---|---|---|
| 4,247,508 | 1/1981 | Housholder | 264/219 |
| 4,863,538 | 9/1989 | Deckard | 156/62.2 |
| 5,139,711 | 8/1992 | Nakamura et al. | 264/401 |
| 5,156,700 | 10/1992 | Berman et al. | 156/155 |
| 5,182,055 | 1/1993 | Allison et al. | 264/22 |
| 5,198,159 | 3/1993 | Nakamura et al. | 264/401 |
| 5,238,639 | 8/1993 | Vinson et al. | 264/22 |
| 5,256,340 | 10/1993 | Allison et al. | 264/22 |
| 5,263,130 | 11/1993 | Pomerantz et al. | 264/401 X |

FOREIGN PATENT DOCUMENTS

| | | |
|---|---|---|
| 0 322 257 A2 | 6/1989 | European Pat. Off. . |
| 0 470 705 A2 | 2/1992 | European Pat. Off. . |
| 1 232027 | 4/1989 | Japan . |
| 2 78531 | 10/1990 | Japan . |
| 3-224726 | 10/1991 | Japan . |
| WO90/03893 | 4/1990 | WIPO . |
| WO92/08592 | 5/1992 | WIPO . |

OTHER PUBLICATIONS

English abstract of JP 3-224726.

*Primary Examiner*—James Sells
*Attorney, Agent, or Firm*—George W. Neuner

[57] ABSTRACT

In a method for producing a three-dimensional object wherein the object is produced layer by layer by applying a layer of a material which can be solidified by irradiation with electromagnetic radiation and subsequently solidifying the layer at the points corresponding to the object by irradiation the problem is encountered that the production process is considerably delayed by long heating and cooldown times within the apparatus used for the production. According to the invention this problem is solved by irradiating and thereby solidifying in each layer a region of the material surrounding the object so as to produce a container wall (26) for the material (21).

16 Claims, 1 Drawing Sheet

METHOD AND APPARATUS FOR PRODUCING A THREE-DIMENSIONAL OBJECT

FIELD OF THE INVENTION

The invention relates to a method for producing a three-dimensional object and to an apparatus for carrying out such a method.

BACKGROUND OF THE INVENTION

Such a method is disclosed for example in U.S. Pat. No. 4,863,538. In this case the material is a powderous solid material which is applied in layers to the upper side of a lowerable piston and which is sintered at places corresponding to the object by means of a laser. For forming the successive layers the piston is stepwise lowered within a cylinder which surrounds the powderous material. A heater maintains the material at an operating temperature of about 150° C. as required for the sintering process.

This known method has the drawbacks that together with the material also the cylinder must be heated up to the operating temperature which requires a preheating time of 2 to 3 hours. Moreover, before removing the object from the cylinder a slow cooling down to below 100° C. must be carried out in order to avoid the risk of dust explosion. During this cool-down period the object must remain within the cylinder. In summary, the known method results in long rigging and strip-down times and therefore long production times. This drawback shall be eliminated with the invention.

SUMMARY OF THE INVENTION

According to the invention this problem shall be solved by the features as set forth in the claims. Since according to the invention the container wall corresponding to the conventional cylinder is produced simultaneously with the object, the preheating of the cylinder and therefore the long rigging time is eliminated. After finishing the object the container wall which does not form part of the apparatus can be removed from the apparatus together with the object for a controlled cool-down, so that the long cool-down time within the apparatus and therefore the strip-down time is also eliminated.

DESCRIPTION OF THE PREFERRED EMBODIMENTS

Figure 1:
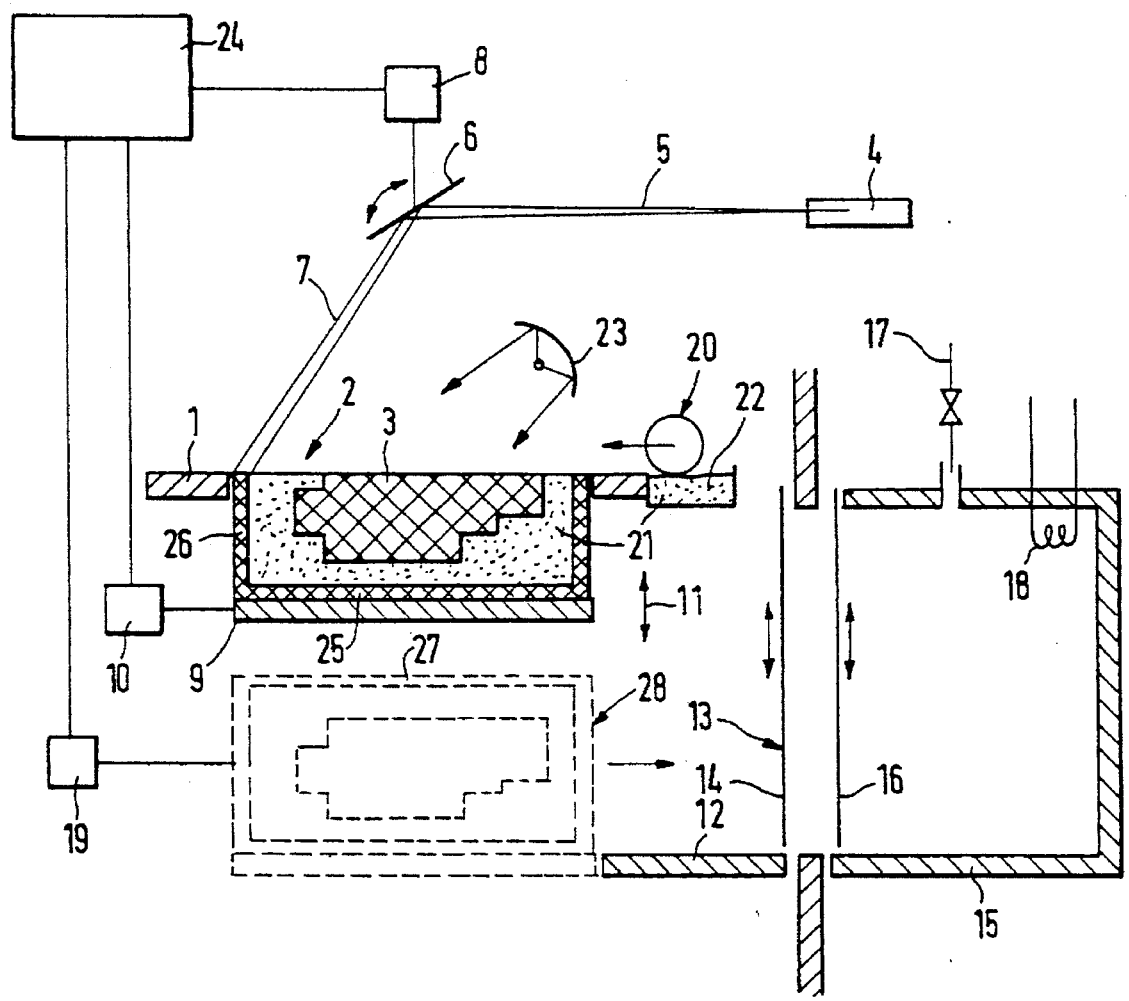
FIG. 1 is a schematic illustration of an apparatus in accord with one embodiment of the present invention.

In the following the invention shall be described with an embodiment by reference to the FIGURE. The FIGURE is a schematic sectional representation of the inventive apparatus.

The apparatus comprises a substantially horizontal work table 1 having a hole in the form of a cutout 2. The cutout 2 is preferably circular with a cross-section which is greater than the greatest cross-sectional area of the object 3 to be produced. However, the cutout 2 may also have any other suitable shape. An irradiation device 4, for example a laser, delivering a focussed light beam 5 is arranged above the work table 1. The light beam is deflected through a deflection device 6, for example a rotating mirror, onto the plane of the work table 1 in the form of a deflected beam 7. A control device 8 controls the deflection device so that the deflected beam 7 strikes any desired point within the operational region defined by the cutout 2.

An as well substantially horizontal base 9 in the form of a platform is provided below the cutout 2. The base 9 is formed as a laterally guided table having a shape corresponding to the cutout 2 and is displaceable in direction of the arrow 11 by means of an as well laterally arranged level adjustment device 10 between an uppermost position in which the upper surface of the base is within the cutout 2 and substantially at the same level as the upper side of the work table 1, and a lowermost position which is indicated by dotted lines in the FIGURE and in which the base 9 is lowered to such an extent that the surface thereof is level with an adjacent receiving plate 12. The distance between the receiving plate and the work table, i.e. the level adjustment range of the base, is greater than the maximum height of the object 3.

Adjacent to the receiving plate 12 the apparatus comprises an opening 13 which is tightly closeable by means of a door 14. A removal container 15 is provided which can be sealingly attached or docked, resp., to the opening at the side thereof opposite to the receiving plate 12. The removal container 15 also comprises a door 16 for sealingly closing the container 15 and supply means 17 for an inert gas, for example nitrogen, and a heater 18.

An output or discharge device, resp., 19, for example in the form of a laterally arranged pusher or the like, is formed and disposed to displace the object resting on the base 19 in the lowermost position thereof from the base 9 onto the receiving plate 12 and through the (opened) doors 14, 16 into the removal container 15.

A device 20 for applying a layer of a powderous material 21 is conventionally formed as a drum which is horizontally movable along the work table 1 across the cutout 2 from a position in which the material 21 is applied from supply 22 onto the surface of the drum. A possible material 21 is low-melting plastic material such as nylon having a grain size of about 10 μm or below, but also metal powder or hybrids, i.e. plastic-coated metal or ceramic powder. Further, a radiation heater 23 directed towards the operational region is disposed above the cutout 2.

The control device 8, the level adjustment device 10 and the discharge device 19 are each connected with a central control device 24 for a coordinated control of those devices in the manner described in the following.

In operation the base 9 is first moved by means of the level adjustment device 10 into the uppermost position in which the surface of the base 9 is level with the surface of the work table 1, and thereafter lowered by an amount corresponding to the intended thickness of the first material layer so as to form within the cutout 2 a lowered region which is defined laterally by the walls of the cutout 2 and at the bottom by the surface of the base 9. Thereupon a first layer of the material 21 having the intended layer thickness is charged into the space formed by the cutout 2 and the base 9 or into the lowered region, resp., by means of the drum 20 and heated up to a suitable working temperature, for example 140° C. to 160° C., by means of the heater 23. Thereafter the control device 24 drives the deflection device 6 through the control 8 thereof in such a manner that the deflected beam 7 subsequently strikes all points of the layer and solidifies the material 21 thereat by sintering. In this manner first a solid bottom layer 25 is formed.

In a second step the base 9 is lowered by the amount of one layer thickness by the control device 24 through the level adjustment device 10 and a second material layer is charged into the thus generated lowered region within the cutout 2 by means of the drum 20 and again heated up by the heater 23. This time the deflection device 6 is driven by the control device 24 in such a manner that the deflected beam 7 strikes only the region of the material layer adjacent to the inner surface of the cutout 2 and solidifies the material layer thereat by sintering, whereby a first annular wall layer having a wall thickness of about 2 to 10 mm is produced which completely surrounds the remaining powderous material of the layer.

After lowering the base 9 by the amount of the layer thickness of the next layer, charging material 21 and heating in the same manner as above described the production of the object 3 proper can start. To this end the control device 24 drives the deflection device 6 in such a manner that the deflected beam 7 strikes those points of the layer which are to be solidified corresponding to the coordinates of the object 3 as stored in the control device 24. Before or after the production of this object layer a second annular wall layer of equal wall thickness is sintered onto the first annular wall layer in the same manner as described above.

The procedure is repeated in analogous manner for the further layers. By sintering an annular wall layer onto the underlying annular wall layer when producing each object layer an annular wall portion 26 in the form of a container wall is generated which surrounds the object 3 together with the remaining unsintered material 21 and prevents material 21 from escaping when lowering the base 9 to below the work table 1.

After finishing the final object layer only an annular wall layer is solidified in a manner corresponding to the above-described second step and thereafter a cover layer 27 is solidified in the same manner as when producing the bottom layer 25, the cover layer 27 cooperating with the bottom layer 25 and the wall portion 26 to form a container 28 which sealingly surrounds the object 3 and the remaining unsintered material.

Thereafter the base is lowered in the manner indicated by dotted lines in the FIGURE to the level of the receiving plate 12 by means of the level adjustment device 10 and a removal container 15 which was previously heated to a temperature of as well about 140°–160° C. under a nitrogen atmosphere is attached to the discharge opening 13. After opening the doors 14, 16 the discharge device is operated to push the container 28 through the opening 13 into the removal container 15. After closing the doors 14 and 16 the removal container 15 can be removed and a new object can be produced without further waiting delay. The required slow cool-down of the object 3 occurs within the removal container 15 by corresponding control of the heater 18 independently of the production of the next object.

During the production of the object 3 an inert gas atmosphere, preferably a nitrogen atmosphere, is also produced within the working region by per se known (not shown) means. Owing to the lockage-type form of the doors 14, 16 an escape of this atmosphere when discharging the finished object 3 and therefore an interruption of the production is avoided.

Modifications of the invention are possible. The production of the bottom layer 25 can be omitted; also the cover layer 27 is not required if a safe cool-down of the then bare remaining powder within the removal container 15 under inert gas atmosphere is possible; on the other hand, when producing both layers 25, 27 and thus the sealed container 28, the cool-down can possibly be carried out without removal container 15 or without inert gas atmosphere, resp.

Apart from a drum the layer applying device 20 may also be designed as a dispensing or scraping device, pusher, brush, blade or any other device which is suitable for applying a uniform layer of a powderous material; the heaters 18, 23 may be formed as a radiation or circulating air heater and any other source of electromagnetic radiation outputting a focussed beam or sufficient energy for sintering, such as a light source or a cathode ray source, may be used for the irradiation device. Further, liquid material can be used in place of powderous material. Finally, the solidified wall layer forming the container wall is not necessarily circular, but may have any suitable form of a substantially closed line. However, preferably this form corresponds to the shape of the cutout 2.

We claim:

1. A method for producing a three-dimensional object by layerwise solidifying a powdered material which can be solidified by irradiation with an electromagnetic radiation, the method comprising the steps of:

a) moving an elevation adjustable base at least partly into a cutout of a work table, said cutout having an inner defining surface closely surrounding said base;

b) charging an amount of said powdered material corresponding to a predetermined thickness of a first layer into said cutout onto said base;

c) irradiating a contour region of said first layer adjacent to said inner defining surface of said cutout;

d) lowering said base by an amount corresponding to a layer thickness of a next layer;

e) charging an amount of said powdered material corresponding to said layer thickness of said next layer into said first layer;

f) irradiating regions of said next layer which correspond to said object to be formed and to said contour region adjacent to said inner surface of said cutout to form said object and a container having a wall surrounding said object; and g) repeating said steps d) to f) for a predetermined number of layers to form said object within said container made from said powdered material;

wherein, before producing said object, solidifying a material layer over the entire area enclosed by the container wall so as to produce a closed bottom layer for said container.

2. The method of claim 1 further comprising producing said object in an inert gas atmosphere.

3. The method of claim 1, further comprising providing a controlled laser beam for irradiation.

4. The method of claim 1, further comprising irradiating said powdered material to sinter said material together at said irradiated regions.

5. The method of claim 1, wherein forming a container wall around the object further comprises solidifying a corresponding annular region in each layer so as to generate a cylindrical container wall.

6. The method of claim 1, further comprising, after producing said container and said object, solidifying a material layer over the entire area which is enclosed by the container wall to produce closed cover for said container.

7. The method of claim 1, further comprising moving the container together with said object, after completion thereof, into a removal container for cool-down under controlled conditions.

8. Apparatus for producing a three-dimensional object by layerwise solidifying a powdered material which can be solidified by irradiation, the apparatus comprising:

a work table having a cutout with an inner defining surface;

an elevation adjustable base having an external contour corresponding substantially to said inner defining surface of said cutout;

level adjustment means for displacing said base in a vertical direction between an uppermost position in which an upper surface of said base is within said cutout and substantially at the same level as an upper side of said work table and a lowermost position below said work table in which a distance between said work table and an upper side of said base is greater than a maximum height of said object;

means for applying a layer of said powdered material onto said base;

irradiation means disposed above said work table in a fixed positional relationship to said work table for irradiating selected portions of said layer; and control means connected to said irradiation means for controlling said irradiation means to irradiate portions of said layer corresponding to said object and an additional region adjacent to said inner surface of said cutout and surrounding said object region so as to form a container having a wall around said object region, said container having integrally formed bottom and side walls.

9. The apparatus of claim 8, wherein said base is formed as a table which is guided laterally or from below and comprises a laterally arranged elevation adjustment means for said table.

10. The apparatus of claim 8, further comprising means for lowering said base into a position level with a laterally adjacent receiving plate.

11. The apparatus of claim 10, further comprising a container having a wall surrounding said object and discharge means adapted to engage said container wall for displacing said container from said base onto said receiving plate.

12. The apparatus of claim 10, further comprising a closeable opening for discharging said container surrounding said object.

13. The apparatus of claim 12, further comprising a removal container and means for sealingly attaching said removal container to said closeable opening.

14. The apparatus of claim 13, further comprising inert gas supply means and an adjustable heating means for said removal container.

15. The apparatus of claim 14, wherein the inert gas supply means consists of a nitrogen supply means.

16. The apparatus of claim 8, wherein the irradiation means comprises a laser beam.

* * * * *